W. H. WALDROFF.
TIRE TOOL.
APPLICATION FILED APR. 1, 1922.
1,420,792.
Patented June 27, 1922.
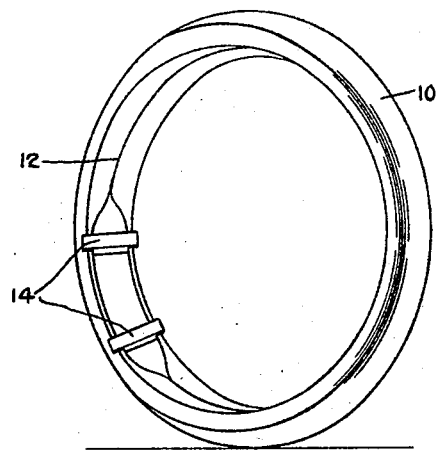
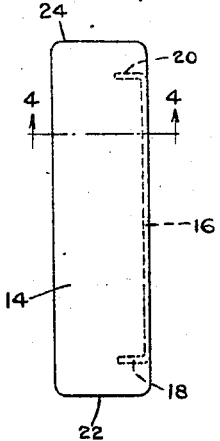
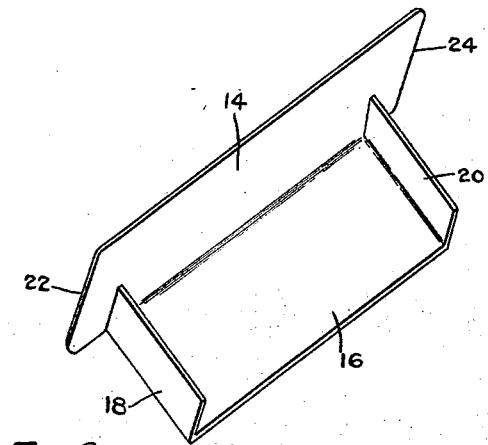
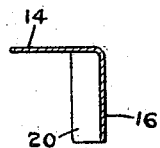
INVENTOR:
WILLIAM H. WALDROFF
BY Whiteley and Rickman
ATTORNEYS.

UNITED STATES PATENT OFFICE.

WILLIAM H. WALDROFF, OF MINNEAPOLIS, MINNESOTA.

TIRE TOOL.

1,420,792.  Specification of Letters Patent.  Patented June 27, 1922.

Application filed April 1, 1922. Serial No. 548,816.

*To all whom it may concern:*

Be it known that I, WILLIAM H. WALD- ROFF, a citizen of the United States, residing at Minneapolis, in the county of Hennepin and State of Minnesota, have invented certain new and useful Improvements in Tire Tools, of which the following is a specification.

My invention relates to tire tools, and an object is to provide a tool which may be readily manipulated to spread the customary split in a tire casing so that the latter may be readily inspected and repaired. Another object is to provide a tool of this character which may be readily constructed from sheet material and which occupies only a small space so that it can be readily carried in the pocket or in a tool box.

The full objects and advantages of my invention will appear in connection with the detailed description, and the novel features embodied in my inventive idea will be particularly pointed out in the claim.

In the accompanying drawings which illustrate the application of my invention,— Fig. 1 is a perspective view illustrating the manner of using my device in connection with a tire casing. Fig. 2 is a perspective view of the device. Fig. 3 is a top plan view. Fig. 4 is a view in section on the line 4—4 of Fig. 3.

Referring to the drawings, the numeral 10 designates the casing of a pneumatic tire, this casing as usual being made so that the inner wall is split circumferentially as indicated at 12. The natural resiliency of the tire holds it together at the split so that in order to obtain access to the interior the two walls at the split must be spread apart in order that the inner face of the casing may be reached. I, therefore, provide a tool which is bent into the desired shape from a single piece of sheet metal. This tool comprises a top member 14 and a member 16 bent at right angles thereto. The member 16 is shorter than the member 14 since the ends of the member 16 are bent at right angles to form end flanges 18 and 20 whereby the member 14 is provided with projecting end portions 22 and 24 which, when the device is in use, rests upon the walls of the casing at the edges of the split therein and serve as guides when the device is moved around circumferentially. The flanges 18 and 20 may be readily provided by cutting the material at the angle between the members 14 and 16 for the proper distance at both ends and then bending back the material thus cut free from the member 14.

The manner of using the device is clearly shown in Fig. 1. When the casing has been removed, the tool is applied to the split with the flanges 18 and 20 extending down into the casing and resting against the edges or beads of the split. The projecting ends 22 and 24 limit the extent to which the tool extends into the casing and serve as guides so that the tool may from time to time be moved the desired distance around the casing. Two of the devices are preferably employed as shown in Fig. 1 so that a determined portion of the casing may be kept spread, thus allowing ready inspection and permitting insertion of the hand in order to feel if any sharp objects have penetrated to the interior of the casing. The tool may be readily slid around the casing until the entire circumference thereof has been inspected and felt out. This operation is very much facilitated by the use of the tool since it is a difficult matter to inspect and feel out the tire when the split is not kept spread. Since the device is constructed of sheet material and has flat portions, it may be readily utilized for advertising.

I claim:

A tire tool of sheet material comprising two integral members bent at right angles to each other, one of said members being shorter than the other and provided with flanges at its ends bent at right angles to said shorter member, whereby the ends of said longer member project to form guides.

In testimony whereof I hereunto affix my signature.

WILLIAM H. WALDROFF.